Figure 8:
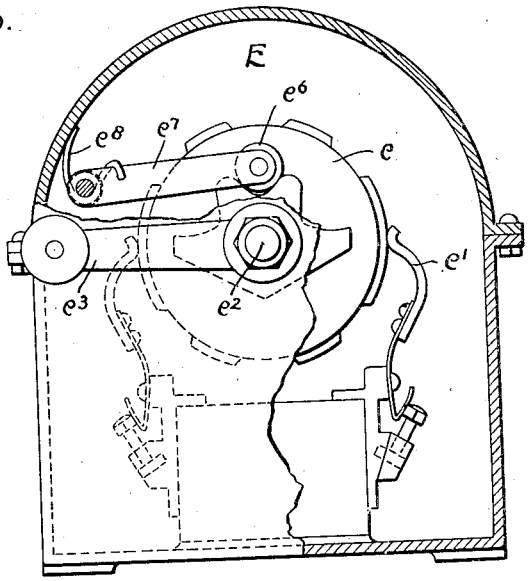

No. 851,823.  
PATENTED APR. 30, 1907.  
W. L. MERRILL.  
SYSTEM OF MOTOR CONTROL.  
APPLICATION FILED JULY 21, 1906.  
4 SHEETS—SHEET 1.
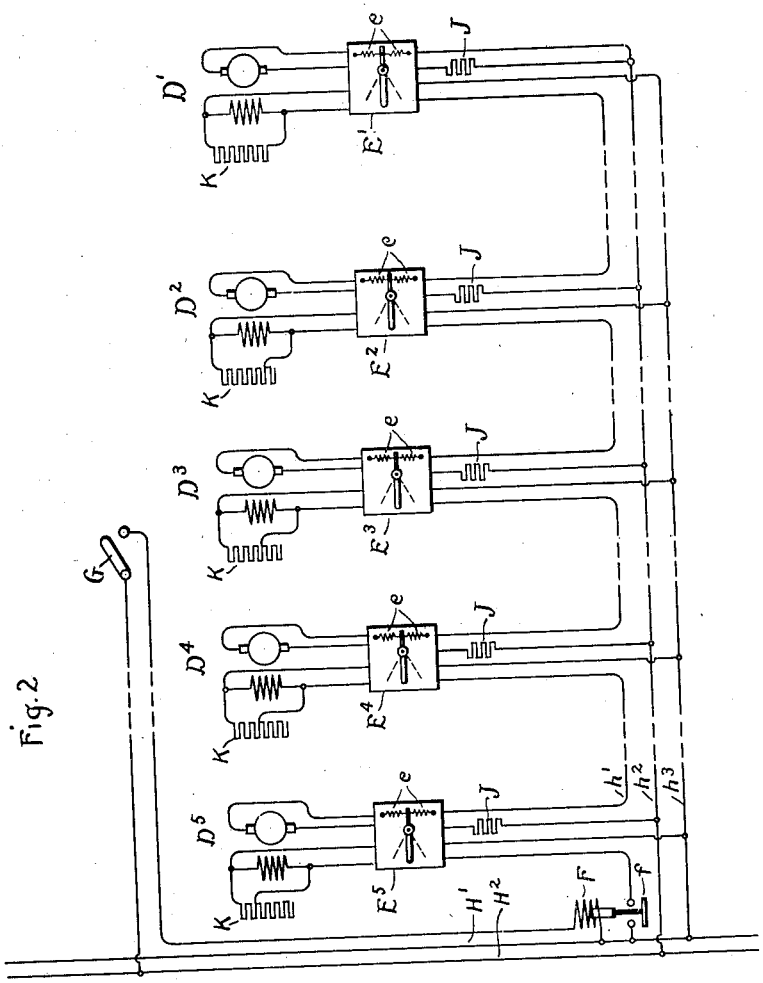
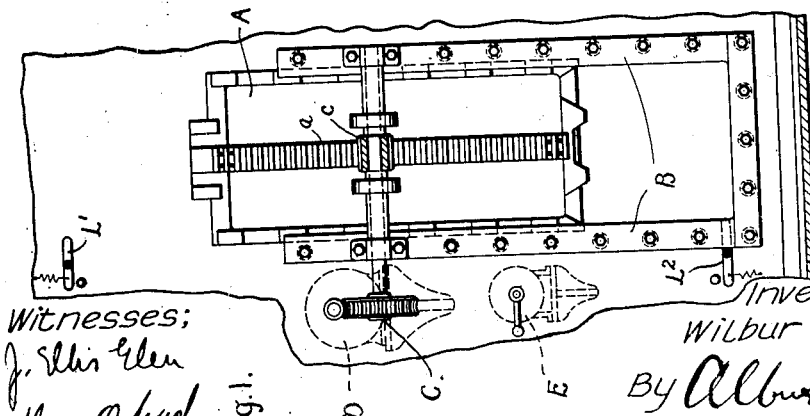
Witnesses;
Inventor:
Wilbur L. Merrill
By Albert G. Davis
Atty.

No. 851,823. PATENTED APR. 30, 1907.
W. L. MERRILL.
SYSTEM OF MOTOR CONTROL.
APPLICATION FILED JULY 21, 1906.
4 SHEETS—SHEET 2.
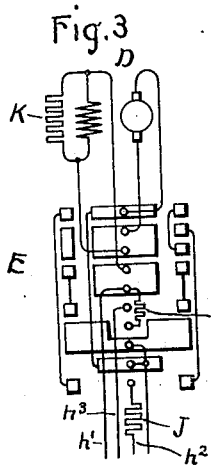
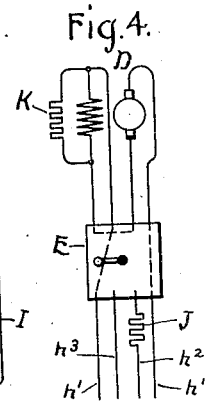
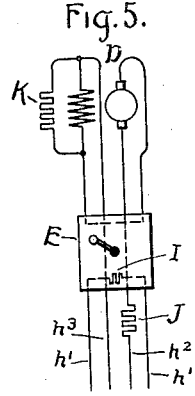
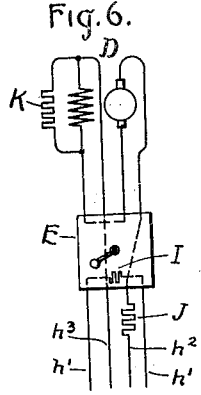
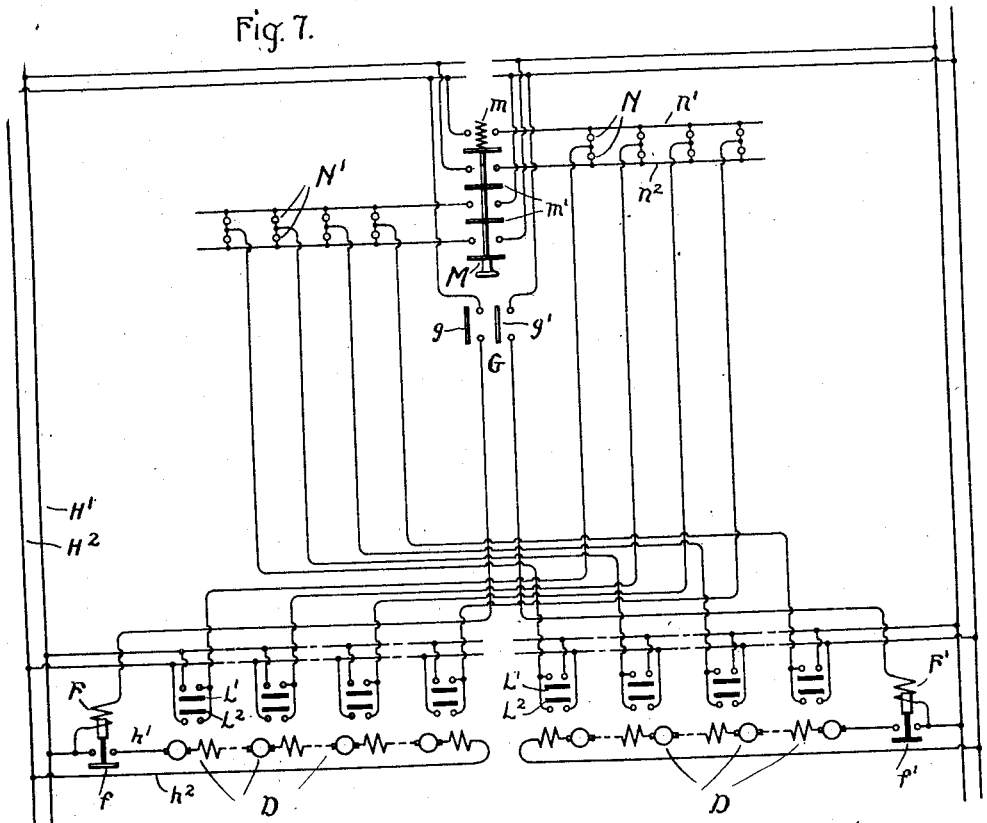
Witnesses:
Inventor:
Wilbur L. Merrill;
By Albert G. Davis
Att'y.

No. 851,823. PATENTED APR. 30, 1907.
W. L. MERRILL.
SYSTEM OF MOTOR CONTROL.
APPLICATION FILED JULY 21, 1906.

4 SHEETS—SHEET 3.

Witnesses:

Inventor
Wilbur L. Merrill,
by Albert ... Davis
Att'y.

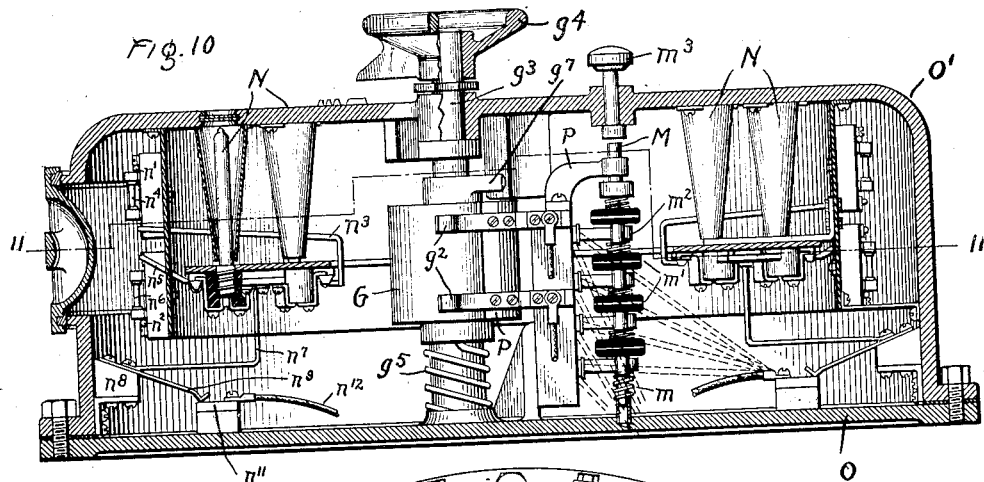
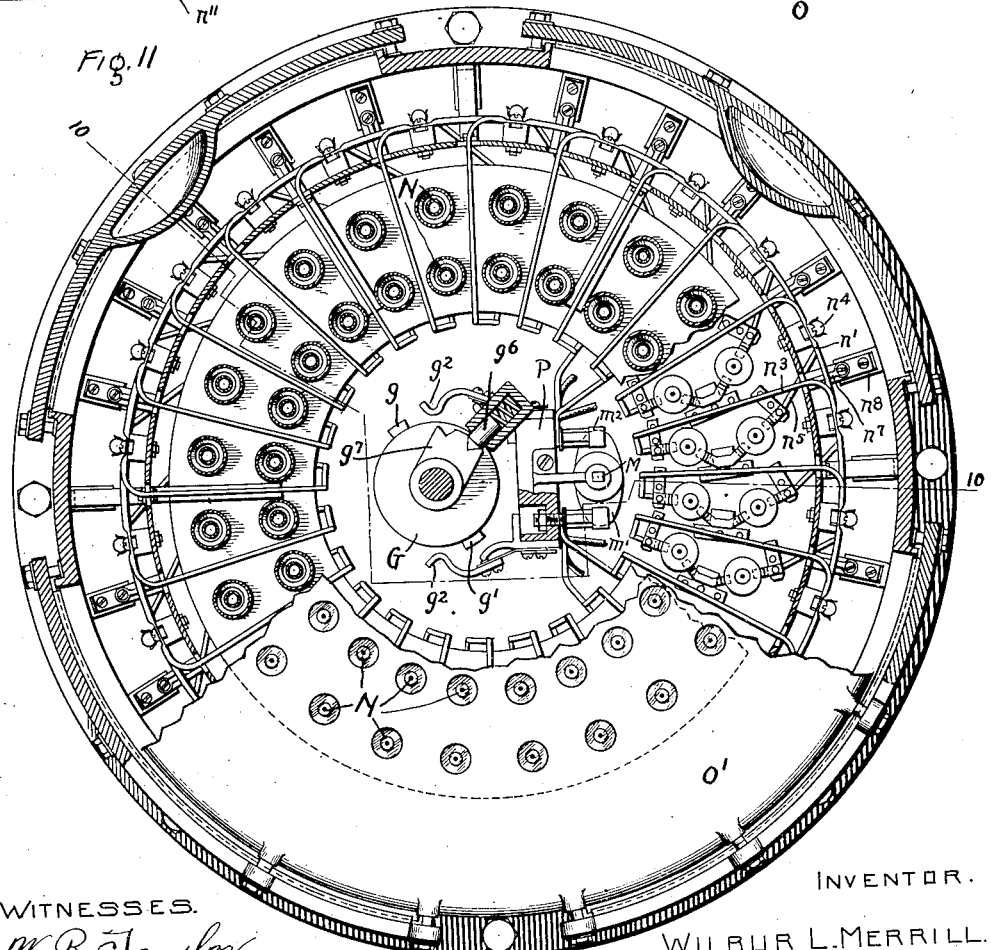

UNITED STATES PATENT OFFICE.

WILBUR L. MERRILL, OF SCHENECTADY, NEW YORK, ASSIGNOR TO GENERAL ELECTRIC COMPANY, A CORPORATION OF NEW YORK.

SYSTEM OF MOTOR CONTROL.

No. 851,823.  Specification of Letters Patent.  Patented April 30, 1907.

Application filed July 21, 1906. Serial No. 327,152.

*To all whom it may concern:*

Be it known that I, WILBUR L. MERRILL, a citizen of the United States, residing at Schenectady, county of Schenectady, State of New York, have invented certain new and useful Improvements in Systems of Motor Control, of which the following is a specification.

My invention relates to control systems for electric motors, and is particularly applicable to the control of electrically-operated bulkhead doors on board ship; though in some of its features not limited to this specific application.

In the control of bulk-head doors on shipboard it is essential that each door be controllable both locally and from a distant point, and such systems have been arranged heretofore with switching devices for each motor controllable both from a distance to connect the motor for lowering the door, and manually by a man at the door to connect the motor for either raising or lowering the door. For convenience in the distant control, the devices for actuating the switches by the distant control have ordinarily been grouped; the controlling devices for five or six motors being connected in a single circuit and controlled by a single switch at a distant point. The manual control has been so arranged that a man at any door can control the movement of that door, regardless of the condition of the control system, that is, whether the distant control-switch for the group to which that motor belongs is closed or not. It has further been the practice heretofore to arrange the switches for all the motors so that each motor is connected directly across the power-mains when operating either under distant or local control.

One feature of my invention consists in so arranging the circuit connections and switching devices, that for the distant control all the motors of each group are connected in series with each other to the source. By means of my invention I am able greatly to reduce the size of wire required for the system, since the motors are connected in series instead of in parallel for the distant control, which is the only time they are likely to operate simultaneously. A single electromagnet suffices for the distant control for the entire group of motors, instead of one or more magnets for each motor, as have been required heretofore, and the number of conductors extending to the emergency station is reduced. Furthermore, when all the doors of a group are closed, they are held firmly on their seats, so long as the circuit remains closed at the emergency station, with a pressure corresponding to the full torque of the operating motor, and without any more current than is required to operate one motor.

My invention further comprises an arrangement for determining the order of closing of the doors in each group.

My invention further comprises certain novel arrangements of the indicating devices for showing the operator at the emergency station the condition of all the doors.

My invention further comprises certain features in the construction and arrangement of the control switches and indicating devices at the emergency station.

Figure 9:
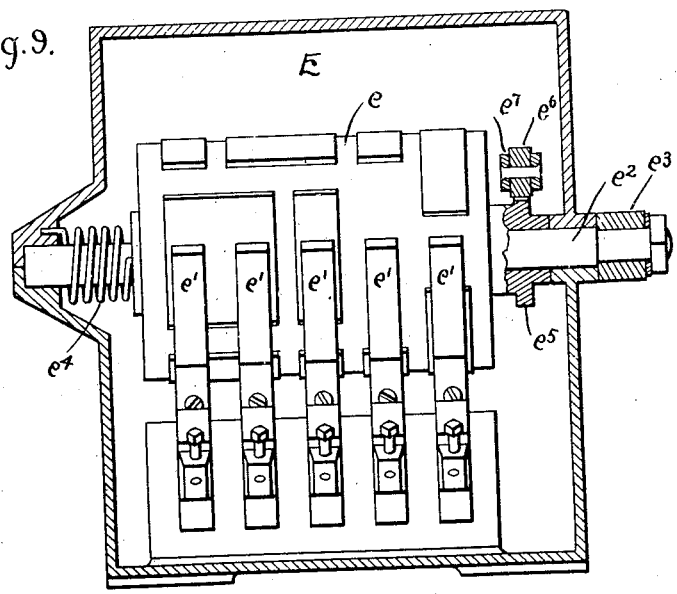

In the accompanying drawings, Figure 1 represents one of a system of bulk-head doors adapted for control in accordance with my invention; Fig. 2 shows diagrammatically a motor control system arranged in accordance with my invention; Fig. 3 shows a development on a plane surface of the contacts of one of the switches in Fig. 2; Figs. 4, 5 and 6 show diagrammatically the circuit connections established by the switch of Fig. 3, in its three positions; Fig. 7 shows diagrammatically the circuit connections of the distant control and indicating devices; Fig. 8 shows an end elevation partly in cross-section of the motor-controlling switch shown diagrammatically in Fig. 3; Fig. 9 shows a side elevation of the same partly in cross-section; and Figs. 10 and 11 show two cross-sectional views of the apparatus at the emergency station, the cross-section of Fig. 10 being taken on the line 10—10 of Fig. 11, and the cross-section of Fig. 11 being taken on the line 11—11 of Fig. 10.

In Fig. 1, A represents a bulk-head door vertically movable in the guides B, and carrying a rack $a$ engaging a pinion $c$ on a shaft C, which is driven by an electric motor D. E represents a controller for the electric motor with handles on both sides of the bulkhead.

The circuit arrangements are shown in Fig. 2. In this figure $D^1$ to $D^5$ represent five motors which form one group for the distant control. In practice a sufficient number of motors are connected in series in a group to give the proper ohmic resistance to the motor circuit, when all the motors are at rest, for drawing from the supply mains the desired amount of current for starting. I find that nine or ten motors in a group give satisfactory results for operating sliding bulkhead doors, but for different kinds of service this number should be raised. If there are not enough motors for a group to give the desired ohmic resistance, a dead resistance may obviously be inserted in series with the motors to bring the starting current down to the desired amount. $E^1$, $E^2$, etc., represent manually-operated reversing switches for the several motors, which are normally held in off position by the centering springs $e$. All these reversing switches are identical, and one of them is shown in Fig. 3 with the contacts developed on a plane surface. $f$ represents a switch contact controlled by an electromagnet F, which, in turn, is controlled by a control-switch G at the distant point or emergency station. $H^1$ and $H^2$ represent the power-mains, from which three branches $h^1$, $h^2$ and $h^3$ are carried off to the motors of this group. I (shown in Fig. 3), J and K represent resistances.

With the reversing switches all in off position, where they are normally held when not operated by a man at the door, the motors are all connected in series in the line-wire $h^1$. This will be seen by tracing out the circuits of the controller E in Fig. 3 through the contacts which are closed when this switch is in off position. These circuit connections are shown in dotted lines in Fig. 4. The line-wires $h^1$ and $h^2$ consequently form a series circuit, including all the motors in series. The line-wire $h^2$ is connected to the power-main $H^2$, and the line-wire $h^1$ is arranged to be connected to the power-main $H^1$ when the normally open switch $f$ is closed. Consequently, when switch G is closed, energizing magnet F so as to close switch $f$, all five motors are connected in series across the power-mains.

Neglecting for a moment the resistances K, it will be seen that if the motors are all of similar design, the torque of all the motors will be the same, since the same current is passing through the field and armature of all the motors. The amount of this current, when the switch $f$ is first closed, is determined simply by the ohmic resistance of the five motors in series and by placing the proper number of motors in series may be made anything desired. Since the torque of all the motors is the same, the motor or motors connected to the doors having the least friction will start up first. The counter-electromotive force produced by rotation in the first motor that starts tends to reduce the current-flow and to prevent the other motors from starting; but as soon as the first motor closes its door, so that the motor is brought to rest, the counter-electromotive force of the motor disappears so that the current is again increased to an amount limited only by the ohmic resistance of the motors, unless another motor has already started. Thus, if the friction of the several doors is unequal, the doors will close successively; the doors with the smallest friction being closed first. On the other hand, if the friction of all the doors were exactly equal, all the doors would start simultaneously, but with reduced speed. If any door should stick while moving toward closed position, its motor would be stopped, increasing the voltage on the terminals of the other motors and accelerating their closing. As soon as the other doors are closed, the current will again rise to a value limited only by the ohmic resistance of the motors, so that the maximum current is supplied to the motor driving the door which has stuck. The doors will thus all be closed either serially or simultaneously, according to their relative friction. I have found by actual test that the time consumed in closing all the doors of the group is substantially the same whether the motors all start simultaneously or whether one door closes before another starts.

If it is desired to close the doors in a predetermined order, the adjustable resistances K may be employed to shunt the motors, and by properly adjusting these resistances, the doors may be caused to close in any desired order. It is sometimes desirable in an emergency that the outer doors nearest the hull of the ship should be closed first, and this result may be obtained by means of the resistance shown. In Fig. 2 these resistances are so adjusted that the door operated by motor $D^1$ will close first, followed by $D^2$, etc., in order. While I have shown the resistances shunting only the fields of the motors, it is evident that they may be placed in shunt to both field and armature, or to the armature alone. Furthermore, it will be seen that the same result may be obtained mechanically, as by adjusting the friction of the several doors in a group.

I have thus far described only the distant control. The local control is obtained manually by moving the controlling switch from off position to either raising or lowering position. It will be seen by inspecting the contact arrangement of the switch E in Fig. 3 that moving the switch from its mid-position to either of its other positions will cut the motor $D^1$ out of the series circuit, and will substitute the resistance I in that circuit. This resistance is proportioned in amount to correspond to the ohmic resistance of the motor $D^1$. Thus, the motor may be cut out without interrupting the series circuit containing the other motors, or interfering with the distant control of the other motors. In its two operative positions the switch E connects the motor $D^1$ across the conductors $h^2$ and $h^3$ for opposite directions of rotation. This connection is made through the resistance J in order to limit the current-flow, since the motor is now connected directly across the power-mains instead of in series with the other four motors. The circuit connections established when switch E is moved manually to raise and to lower the door are shown respectively in Figs. 5 and 6.

With the arrangement above described, it will be seen that the conductors $h^1$, $h^2$ and $h$ carry the current of only a single motor, unless two motors of the same group are being operated manually at the same time. Consequently these wires may be made much smaller than is necessary if all five motors were connected in parallel for the distant control, as in the ordinary arrangement. Furthermore, by the series arrangement of the motors a single switch contact $f$ suffices for the control of all the motors from a distant point. It will furthermore be seen that the distant control is automatically selective, that is, if a portion of the doors of any group are already closed when the distant control-switch is closed, only the motors of the doors which are open will have to operate, so that if half the doors of the group are already closed, only half the usual time is required for closing the remaining doors.

Figs. 8 and 9 show a suitable construction for the motor controlling switch E, shown diagrammatically in Fig. 3. As shown in Figs. 8 and 9, the switch E comprises a rotatable drum $e$ and stationary contact-fingers $e^1$. The shaft $e^2$ of the drum extends through the casing of the switch, and is provided with an operating-handle $e^3$. $e^4$ represents a centering spring for holding the switch normally in mid-position, except when moved by hand. The switch is provided with a star-wheel $e^5$, on which rides a roller $e^6$ carried by a pivoted member $e^7$. A spring $e^8$ presses against this member, holding the roller $e^6$ against the star-wheel, so as to produce a quick movement of the switch from one position to another when moved by hand, and also to stop the switch in mid-position when released by hand and returned by the spring $e^4$.

Fig. 7 shows the circuit connections of the apparatus at the emergency station, including the controlling switch and the indicating devices for showing whether the doors are open or closed. D D represent two groups of motors, one of which may be on the starboard, and the other on the port side of the ship. The controlling switches and the conductor $h^3$, shown in Fig. 2, are omitted from this figure for the sake of simplicity. One group of motors is controlled by a magnet-coil F, and the other by a magnet-coil $F^1$. At each door is provided a pair of signal switches $L^1$ and $L^2$, which are indicated diagrammatically in Fig. 1, and which are normally open as long as the door stands in any mid-position. When the door is in its extreme upper position, the switch $L^1$ is engaged by the door, and closed. Similarly, when the door is completely closed, the switch $L^2$ is engaged thereby and closed. G represents the controlling switch at the emergency station, which I have shown as comprising a pair of movable contacts $g$ and $g^1$, controlling the magnet-coils F and $F^1$, respectively. Although I have shown only one magnet-coil controlled by each contact, it is obvious that as many magnet-coils as desired may be placed in series or in parallel with magnet-coils F or $F^1$, so as to control as many groups of doors as desired by a single contact $g$. M represents a switch at the emergency station normally held open by the spring $m$, and controlling the circuits of the return signal devices N and $N^1$, which may consist of incandescent lamps, or any other suitable indicating means. The lamps N correspond to the doors controlled by the magnet-coil F, and the lamps $N^1$ correspond to the doors controlled by the magnet-coil $F^1$. Two lamps are provided for each door, and are connected in series. The contacts of the switch M are arranged to connect each pair of lamps across the source of current indicated by the line-wires $H^1$ and $H^2$. A lead from the point of connection between the two lamps of each pair is carried to the signal switches $L^1$ and $L^2$ of the door corresponding to those lamps. These switches are arranged when closed to connect the point between the two lamps to one or the other of the mains $H^1$ and $H^2$.

If all the doors are in mid-position, and consequently all the switches $L^1$ and $L^2$ are open, and if the switch M is closed by the operator at the emergency station, each pair of lamps will be connected across the source, and since the normal voltage of each lamp is the same as the voltage of the mains, the lamps will burn at a brilliancy corresponding to half-voltage. This tells the operator that all the doors are in mid-position. If some of the doors are wide open, so that some of the switches $L^1$ are closed, the intermediate points between the lamps of the pairs corresponding to those doors will be connected through the switches $L^1$ to the power-main $H^1$, so that when the switch M is closed the lower lamps of those pairs will be short-circuited, and consequently will be dark, while the upper lamps of those pairs will burn with full brilliancy. In this way an indication is given that some of the doors are wide open. On the other hand, if some of the doors are closed, some of the switches $L^2$ will be closed, so that some of the upper lamps will be dark, and some of the lower lamps at full brilliancy. Consequently, by closing switch M, and observing the condition of the lamps N and $N^1$, the operator at the emergency station can always obtain complete information as to the condition of all the doors.

Figs. 10 and 11 show the arrangement of the controlling switch and indicating lamps at the emergency station. The indicating lamps are shown arranged for twenty-four doors which might be grouped in four equal groups of six doors each or in groups in which the number of motors in series differs to meet the requirements of different kinds of service. Since the apparatus is designed for use on shipboard, it must be protected from moisture, and consequently is inclosed in a casing formed by a base portion O and a cover $O^1$. The controlling switch G for the motor-controlling magnets is shown as comprising a drum pivoted on the base O and carrying two bridging contacts $g$ and $g^1$ controlling the motors on the starboard and port sides of the vessel, respectively. Contact fingers $g^2$ mounted on a standard P on base O are arranged to be bridged by the movable contacts. The operating shaft $g^3$ of the switch extends through the cover and is provided with a handle $g^4$, which is removably secured to the shaft in any suitable way. $g^5$ represents a spring normally holding the switch in open-circuit position, and $g^6$ represents a spring-actuated latch adapted to engage notches in a member $g^7$ on the shaft of the switch to determine its off and closed positions.

N represents the indicating lamps, which are arranged in pairs, as described above, and which are carried by the cover $O^1$. In order that the cover may be removed readily, without the necessity of unfastening any electrical connections, circuits for the lamps are closed in the following manner; a conductor $n^3$ connects one terminal of one lamp of each pair through a fuse $n^4$ to the common conductor $n^1$, shown in Fig. 7; while a second conductor $n^5$ connects one terminal of the other lamp of each pair through a fuse $n^6$ to the common conductor $n^2$. The other two terminals of the lamps of each pair are connected together, and a conductor $n^7$ connects their points of connection to a support $n^8$ on the cover. All the conductors just mentioned are carried by the cover and are removable therewith. To connect these conductors to the leads to the external circuits a conductor $n^9$ is provided, carried by the support $n^8$ in electrical contact with the conductor $n^7$. This conductor $n^9$ is in the form of a spring contact finger adapted to press against the contact block $n^{11}$ when the cover $O^1$ is in position, as shown in Fig. 10. This contact-block $n^{11}$ is secured to the base and to it are connected the leads $n^{12}$ from the external circuits. In this manner the lamp circuits are all disconnected and remade automatically, when the cover is removed and replaced.

The switch M controlling the lamp circuits comprises a movable member supported in the standard P on the base O, and is arranged to move longitudinally in this standard. It is normally held in the raised position shown in Fig. 10 by a compression spring $m$. The member M carries insulated bridging contacts $m^1$, which, when member M is moved downward, bridge stationary contact-fingers $m^2$ carried by the standard P. For operating switch member M, a push-button $m^3$ is provided in the cover $O^1$, which, when depressed, is adapted to engage the end of member M and move it downward against the pressure of spring $m$. The reason for employing this push-button construction, in place of extending the member M through an opening in the cover, is to facilitate replacing the cover after it has been removed. If member M extended through the cover, this member, together with the shaft $g^3$, would make two members which would have to register with their respective openings in the cover in order that the cover might be replaced. This would make the replacing of the cover much more difficult than with the construction shown, in which the shaft $g^3$ is the only part attached to the base which projects through the cover and must be brought into registry with an opening in the cover.

What I claim as new and desire to secure by Letters Patent of the United States, is:

1. In a control system, a plurality of motors, means controllable from a distance for connecting said motors in series to a source of current, and means at each motor for connecting that motor to the source independently of the other motors.

2. In a motor-control system, a plurality of motors, electro-magnetically actuated means for connecting said motors in series to a source of current, and manually-operated means at each motor for connecting that motor to the source independently of the other motors.

3. In a motor-control system, a plurality of motors, a magnetically-actuated switch arranged to connect said motors in series to a source of current for one direction of rotation, and a manually-operated switch for each motor adapted to connect that motor to the source for either direction of rotation independently of the other motors.

4. In combination, a plurality of motors, a control system for connecting said motors in series to a source of current, a switch at a distant point controlling said control system, and manually-operated means at each motor for connecting that motor to the source independently of the other motors.

5. In a motor-control system, a plurality of motors, a series circuit including said motors in series with a source of current, means controllable from a distance for closing said series circuit, and means at each motor for connecting that motor to the source independently of the other motors.

6. In a motor-control system, a plurality of motors, a series circuit including said motors in series and a source of current, means controllable from a distance for closing said series circuit, a switch for each motor arranged to connect that motor to the source independently of the other motors, and a resistance arranged to be inserted in the series circuit by said switch.

7. In a motor-control system, a plurality of motors, a series circuit including said motors in series and a source of current, means controllable from a distance for closing said circuit, a manually-operated switch for each motor arranged to cut that motor out of the series circuit and to connect it to the source for either direction of rotation independently of the other motors, and a resistance arranged to be inserted in the series circuit when a motor is cut out.

8. In a motor-control system, a plurality of motors, a manually operated reversing switch for each motor, means for holding each switch normally in its off position, contacts on each switch connected to the motor and arranged to be closed when the switch is in off position, a circuit extending through the said contacts of the several switches in series, and means controllable from a distance for connecting said circuit to a source of current.

9. In a motor-control system, a plurality of motors, a manually-operated reversing switch for each motor, means for holding each switch normally in its off position, contacts on each switch connected to the motor and arranged to be closed when the switch is in off position, a circuit extending through the said contacts of the several switches in series, means controllable from a distance for connecting said circuit to a source of current, and a resistance arranged to be inserted in said circuit when one of said switches is moved from its off position.

10. In a motor-control system, a plurality of motors, a series circuit including said motors in series, and a source of current, means controllable from a distance for closing said circuit, and means at each motor for cutting the motor out of circuit and substituting a resistance therefor.

11. In a motor-control system, a plurality of motors, a series circuit including said motors in series and a source of current, means controllable from a distance for closing said circuit, and means at each motor for cutting the motor out of circuit and substituting a resistance therefor and for connecting the motor to the source independently of the other motors.

12. In a motor-control system, a plurality of motors, a series circuit including said motors in series and a source of current, a normally-open switch in said circuit, an electromagnet for closing said switch, a control switch at a distant point in circuit with said electromagnet, and means at each motor for cutting the motor out of the series circuit and connecting it to the source independently of the other motors.

13. In a motor-control system, a plurality of motors, a series circuit including said motors in series and a source of current, a normally-open switch in said circuit, an electromagnet for closing said switch, a control switch at a distant point in circuit with said electromagnet, means at each motor for cutting the motor out of the series circuit and connecting it to the source independently of the other motors, and a resistance arranged to be inserted in said series circuit when a motor is cut out.

14. In a motor-control system, a plurality of motors, a manually-operated reversing switch for each motor, means for holding each switch normally in its off position, contacts on each switch connected to the motor and arranged to be closed when the switch is in off position, a circuit extending through the said contacts of the several switches in series, a normally open switch arranged when closed to connect said circuit to a source of current, an electromagnet for closing said normally-open switch, and a control switch at a distant point in circuit with said electromagnet.

15. In a motor-control system, a plurality of motors, a series circuit including said motors in series and a source of current, means controllable from a distance for closing said series circuit, and means at each motor for connecting that motor to the source independently of the other motors without interrupting the series circuit.

16. In a motor-control system, a plurality of motors, a series circuit including said motors in series and a source of current, a normally open switch in said circuit, an electromagnet for closing said switch, a control switch at a distant point in circuit with said electromagnet, and means at each motor for cutting the motor out of the series circuit and connecting it to the source independently of the other motors.

17. In a motor-control system, a plurality of motors, means controllable from a distance for connecting the motors in series to a source of current, and means at each motor for connecting that motor to the source through a resistance, independently of the other motors.

18. In a motor-control system, a plurality of motors, a series circuit including said motors in series and a source of current, means controllable from a distance for closing said series circuit, and means at each motor for connecting that motor to the source through a resistance independently of the other motors.

19. In a motor-control system, a plurality of motors, a series circuit including said motors in series and a source of current, means controllable from a distance for closing said circuit, a manually-operated switch for each motor arranged to cut that motor out of the series circuit and to connect it to the source through a resistance for either direction of rotation independently of the other motors.

20. In a motor-control system, a plurality of motors, a series circuit including said motors in series and a source of current, means controllable from a distance for closing said circuit, and a manually-operated switch for each motor arranged to cut that motor out of the series circuit and to connect it to the source through a resistance for either direction of rotation independently of the other motors and without interrupting the series circuit.

21. In combination, a plurality of motors normally connected in series, means for connecting the series circuit to a source of current, and a switch for each motor adapted to cut said motor out of said circuit and to substitute a resistance therefor and to connect the motor to the source through a second resistance independently of the other motors.

22. In combination, a plurality of motors, means controllable from a distance for connecting said motors in series to a source of current, means for adjusting the relative torques of said motors, and means at each motor for connecting it to the source independently of the other motors.

23. In combination, a plurality of motors, means controllable from a distance for connecting said motors in series to a source of current, the circuits of said motors being adjusted for different torques in the several motors.

24. In combination, a plurality of motors, means controllable from a distance for connecting said motors in series to a source of current, adjustable resistances connected in shunt to the several motors, and means at each motor for connecting it to the source independently of the other motors.

25. In combination, a plurality of motors, means controllable from a distance for connecting the motors in series to a source of current, shunt circuits for the several motors differing in resistance, and means at each motor for connecting it to the source independently of the other motors.

26. In a system of control for bulk-head doors and the like, an emergency station, means controllable from the emergency station for operating the doors, a pair of electro-responsive indicating devices at the emergency station for each door connected in series, means at the emergency station for connecting each pair of devices to a source of current, and means at each door for connecting the point of connection between the two devices of the pair for that door to one or the other terminal of the source according as the door is fully opened or closed.

27. In a system of control for bulk-head doors and the like, an emergency station, means controllable from the emergency station for operating the doors, a pair of electro-responsive indicating devices at the emergency station for each door connected in series, a normally-open switch adapted to connect each pair of devices to a source of current, and switch contacts at each door arranged to connect the point of connection between the two devices of the pair for that door to one or the other terminal of the source according as the door is fully opened or closed.

28. In a system of control for bulk-head doors and the like, an emergency station, means controllable from the emergency station for operating the doors, a pair of electro-responsive indicating devices at the emergency station for each door connected in series, connections from the outer terminals of each pair of devices to the terminals of a source of current, switch contacts at the emergency station in said connections, connections from the point of connection between the two devices of each pair to both terminals of the source, and switch contacts in the last-mentioned connections controlled by the movement of the door corresponding to that pair of devices.

29. In a system of control for bulk-head doors and the like, an emergency station, means controllable from the emergency station for operating the doors, a pair of electro-responsive indicating devices at the emergency station for each door connected in series, connections from the outer terminals of each pair of devices to the terminals of a source of current, connections from the point of connection between the two devices of each pair to both terminals of the source, and switch contacts in the last-mentioned connections controlled by the movement of the door corresponding to that pair of devices.

30. In a system of control for bulk-head doors and the like, a controlling switch, a casing therefor comprising a base and a cover, electro-responsive indicating devices carried by the cover, terminal contacts secured to the base, and contacts carried by the cover and connected to said devices adapted to engage the base contacts when the cover is in position.

31. In a system of control for bulk-head doors and the like, a casing comprising a base and a cover, a controlling switch mounted on said base within the casing, an operating shaft therefor extending through the cover, a removable handle on said shaft, electro-responsive indicating devices carried by the cover, terminal contacts secured to the base, and contacts carried by the cover and connected to said devices adapted to engage the base contacts when the cover is in position.

32. In combination, a casing comprising a base and a cover, a switch mounted on said base within said casing, an operating shaft therefor extending through said cover, a removable handle on said shaft, a spring-actuated reciprocating switch mounted on said base within the casing, and a push-button carried by said cover and adapted when depressed to engage said reciprocating switch when said cover is in place.

33. In combinaion, a casing comprising a base and a cover, a switch mounted on said base within said casing, an operating shaft therefor extending through said cover, a removable handle on said shaft, a spring-actuated reciprocating member mounted on said base within said casing, a plurality of bridging contacts carried by said member, a plurality of sets of stationary contacts mounted on said base and adapted to be bridged by said bridging contacts, and a push-button carried by said cover and adapted when depressed to engage said reciprocating member when said cover is in place.

34. In a bulk-head door system, a plurality of doors, an electric motor for operating each door, means controllable from a distance for connecting a plurality of said motors in series to a source of current, and means at each door for connecting the operating motor for that door to the source independently of the other motors.

35. In a bulk-head door system, a plurality of doors, an electric motor for operating each door, a control system for connecting a plurality of said motors in series to a source of current, a switch at a distant point controlling said control system, and a manually-operated switch at each door for connecting the operating motor for that door to the source independently of the other motors.

36. In a bulk-head door system, a plurality of doors, an electric motor for operating each door, a circuit including a plurality of said motors in series, means controllable from a distance for connecting said circuit to a source of current, and means at each door for connecting the operating motor for that door to the source independently of the other motors.

37. In a bulk-head door system, a plurality of doors, an electric motor for operating each door, a circuit including a source of current and a plurality of said motors in series, a normally-open switch in said circuit, an electromagnet controlling said switch, a switch at a distant point controlling said electromagnet, and means at each door for cutting the operating motor for that door out of said circuit and connecting it to the source independently of the other motors.

38. In a bulk-head door system, a plurality of doors, an electric motor for operating each door, a circuit including a plurality of said motors in series, means controllable from a distance for connecting said circuit to a source of current, and means at each door for connecting the operating motor for that door to the source independently of the other motors without interrupting said circuit.

39. In a bulk-head door system, a plurality of doors, an electric motor for operating each door, a circuit including a source of current and a plurality of said motors in series, a normally-open switch in said circuit, an electromagnet controlling said switch, a switch at a distant point controlling said electromagnet, and means at each door for cutting the operating motor for that door out of said circuit and connecting it to the source independently of the other motors without interrupting said circuit.

40. In a bulk-head door system, a plurality of groups of doors, an electric motor for operating each door, the motors for each group of doors being connected in series, and means controllable from a distance for connecting each series circuit to a source of current.

41. In a bulk-head door system, a plurality of groups of doors, an electric motor for operating each door, the motors for each group of doors being connected in series, a normally-open switch in each series circuit, an electromagnet controlling each switch, and means at a distant point controlling said electromagnets.

42. In a bulk-head system, a plurality of groups of doors, an electric motor for operating each door, the motors for each group of doors being connected in series, a normally-open switch in each series circuit, an electromagnet controlling each switch, switch contacts at a distant point controlling said electromagnets, and a manually-operated switch at each door for connecting the operating motor for that door to the source independently of the other motors.

43. In a bulk-head door system, a plurality of groups of doors, an electric motor for operating each door, the motors for each group of doors being connected in series, means controllable from a distance for connecting each series circuit to a source of current, and means for adjusting the relative operation of the doors of a group to determine the order in which they are to close.

44. In a bulk-head door system, a plurality of groups of doors, an electric motor for operating each door, the motors for each group of doors being connected in series, a normally-open switch in each series circuit, an electromagnet controlling each switch, switch contacts at a distant point controlling said electromagnet, and means for adjusting the relative operation of the doors of a group to determine the order in which they are to close.

45. In a bulk-head system, a plurality of groups of doors, an electric motor for operating each door, the motors for each group of doors being connected in series, and means controllable from a distance for connecting each series circuit to a source of current, the doors of each group being adjusted to close in a predetermined order.

46. In a bulk-head door system, a plurality of groups of doors, an electric motor for operating each door, the motors for each group of doors being connected in series, a normally-open switch in each series circuit, an electromagnet controlling said switch, and a switch at a distant point controlling said electromagnet, the doors of each group being adjusted to close in a predetermined order.

47. In a bulk-head door system, a plurality of doors, an electric motor for operating each door, means controllable from a distance for connecting a plurality of said motors in series to a source of current, and means for adjusting the relative operation of the doors to determine their order of closing.

48. In a bulk-head door system, a plurality of doors, an electric motor for operating each door, and means controllable from a distance for connecting a plurality of said motors in series to a source of current, said doors being adjusted to close in a predetermined order.

In witness whereof, I have hereunto set my hand this 20th day of July, 1906.

WILBUR L. MERRILL.

Witnesses:
BENJAMIN B. HULL,
HELEN ORFORD.